(12) United States Patent
Chang et al.

(10) Patent No.: US 10,488,562 B2
(45) Date of Patent: Nov. 26, 2019

(54) LENS STRUCTURE AND LAMP, BACKLIGHT MODULE, AND DISPLAY DEVICE USING THE SAME

(71) Applicants: RADIANT OPTO-ELECTRONICS (SUZHOU) CO., LTD, Jiangsu (CN); RADIANT OPTO-ELECTRONICS CORPORATION, Kaohsiung (TW)

(72) Inventors: Che-Wei Chang, Kaohsiung (TW); Hui-Ching Hsueh, Kaohsiung (TW)

(73) Assignees: RADIANT OPTO-ELECTRONICS (SUZHOU) CO., LTD, Suzhou (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 254 days.

(21) Appl. No.: 15/648,254

(22) Filed: Jul. 12, 2017

(65) Prior Publication Data

US 2018/0052259 A1    Feb. 22, 2018

Related U.S. Application Data

(63) Continuation of application No. PCT/CN2016/095872, filed on Aug. 18, 2016.

(51) Int. Cl.
*G02B 3/04* (2006.01)
*G02F 1/13357* (2006.01)
(Continued)

(52) U.S. Cl.
CPC ............... *G02B 3/04* (2013.01); *F21V 5/046* (2013.01); *G02B 19/0028* (2013.01);
(Continued)

(58) Field of Classification Search
CPC ...... F21V 5/046; F21V 5/048; G02B 19/0028; G02B 19/0047; G02B 19/0061;
(Continued)

(56) References Cited

U.S. PATENT DOCUMENTS

| 6,582,103 B1 | 6/2003 | Popovich et al. |
| 7,549,781 B2 * | 6/2009 | Kim .................. G02B 19/0066 362/311.01 |

(Continued)

FOREIGN PATENT DOCUMENTS

| CN | 201242086 | 5/2009 |
| CN | 202733781 U | 2/2013 |

(Continued)

OTHER PUBLICATIONS

Taiwan Patent Office, Office Action, Patent Application Serial No., dated Apr. 25, 2018, Taiwan.
(Continued)

*Primary Examiner* — Alan B Cariaso

(57) ABSTRACT

A lens structure, adapted to be optically coupled to a light source, is provided, including a first surface, a second surface, and a light output surface. The first surface includes a convex surface protruding toward the light source. The second surface is opposite the first surface. The light output surface connects the first surface and the second surface. A lamp, a backlight module, and a display device including the lens structure are also provided.

18 Claims, 27 Drawing Sheets

(51) Int. Cl.
*F21V 5/04* (2006.01)
*G02F 1/1335* (2006.01)
*G02B 19/00* (2006.01)
*G02B 7/02* (2006.01)

(52) U.S. Cl.
CPC ... *G02B 19/0061* (2013.01); *G02F 1/133606* (2013.01); *G02B 7/022* (2013.01); *G02F 2001/133607* (2013.01)

(58) Field of Classification Search
CPC .......... G02B 19/0071; G02F 1/133606; G02F 2001/133607
See application file for complete search history.

(56) References Cited

U.S. PATENT DOCUMENTS

| | | | | |
|---|---|---|---|---|
| 8,979,320 | B1* | 3/2015 | McDermott | G02B 19/0028 362/299 |
| 9,435,504 | B2* | 9/2016 | Durand | F21S 41/141 |
| 10,190,730 | B2* | 1/2019 | Yamada | F21K 9/232 |
| 2005/0286251 | A1 | 12/2005 | Smith | |
| 2014/0254172 | A1* | 9/2014 | Wang He | G02B 19/0009 362/311.02 |
| 2015/0109764 | A1* | 4/2015 | Nam | G02F 1/133526 362/97.3 |
| 2017/0114984 | A1* | 4/2017 | Dross | F21V 7/0025 |

FOREIGN PATENT DOCUMENTS

| | | |
|---|---|---|
| CN | 103322505 | 9/2013 |
| CN | 203533426 U | 4/2014 |
| CN | 103807807 | 5/2014 |
| CN | 104037312 | 9/2014 |
| CN | 204513255 U | 7/2015 |
| CN | 105318274 | 2/2016 |
| EP | 1970620 | 9/2008 |
| TW | M492444 | 12/2014 |
| WO | WO 2015/185519 | 12/2015 |

OTHER PUBLICATIONS

European Patent Office, Search Report, PCT Application Serial No., dated Jun. 2, 2017, Europe.
China Patent Office, Office Action, Patent Application Serial No. 201680004223.2, dated Jul. 1, 2019, China.

* cited by examiner

LENS STRUCTURE AND LAMP, BACKLIGHT MODULE, AND DISPLAY DEVICE USING THE SAME

CROSS REFERENCE TO RELATED APPLICATIONS

The present application is a bypass continuation of International Application No. PCT/CN2016/095872 filed Aug. 18, 2016, which is incorporated herein by reference.

BACKGROUND OF THE INVENTION

Field of the Invention

The application relates in general to an illumination technology, and in particular, to a lens structure which can be applied to direct-type backlight technology or illumination lamps with a better light extraction uniformity, and to a lamp, a backlight module, and a display device using the lens structure.

Description of the Related Art

Current illumination technology (e.g. direct-type backlight modules or lamps) usually uses secondary optical lenses to achieve the desired optical effect based on the consideration of thickness, cost and so on. Nowadays, these secondary optical lenses are divided into two categories: the reflective type and the refractive type. Specifically, the light mixing distance of the reflective lens is greater than that of the refractive lens, and thus the reflective lens can use fewer light-emitting diodes (LED) to achieve the desired optical effect.

FIG. 1A is a schematic view illustrating the light extraction method of a conventional reflective lens. As shown in FIG. 1A, the conventional reflective lens 300 includes a total internally reflect (TIR) surface 302 which can reflect light L emitted from a light-emitting diode 304 to exit from a light output surface 306 at the side of the conventional reflective lens 300. However, this light extraction method may easily cause the user to see a shadow cast by the top of the conventional reflective lens 300 (i.e. above the TIR surface 302).

Therefore, a lens structure that can prevent the shadow problem and has a better light extraction uniformity is needed.

BRIEF SUMMARY OF INVENTION

In view of the aforementioned problems, an embodiment of the invention provides a lens structure, adapted to be optically coupled to a light source, including a first surface, a second surface, and a light output surface. The first surface includes a convex surface protruding toward the light source. The second surface is opposite the first surface. The light output surface connects the first surface and the second surface.

According to an embodiment of the invention, the first surface further forms a recess, the convex surface being formed in the recess, and the light source is adjacent to the recess.

According to an embodiment of the invention, the lens structure further includes an annular groove formed in the recess and surrounding the convex surface.

According to an embodiment of the invention, the lens structure further comprises an annular groove, wherein the convex surface is surrounded by the annular groove, and the cross section of the annular groove is a triangle and includes a first sidewall and a second sidewall, wherein the first sidewall is adjacent to the convex surface, and an angle is formed between the second sidewall and the first sidewall.

According to an embodiment of the invention, some light provided by the light source is reflected by the first sidewall and then passes through the second surface.

According to an embodiment of the invention, the amount of light exiting from the second surface is affected by the height of the first sidewall, and they are in positive relation.

According to an embodiment of the invention, the distance between a light output position of some light exiting from the light output surface and an optical axis of the lens structure is affected by the angle between the second sidewall and the first sidewall, and they are in negative relation.

According to an embodiment of the invention, the light output surface is an inclined surface with a single slope.

According to an embodiment of the invention, the lens structure further includes an annular groove formed on the first surface and surrounding the convex surface.

In the lens structures described above, by the convex surface, the light can be converged effectively and thus the light extraction efficiency of the lens structure is increased. Moreover, by the annular groove on the first surface adjacent to the light source, some light can pass through the second surface to exit the lens structure (it is equivalent to having some lighting effects like the refractive lens), so as to improve the light extraction uniformity of the lens structure and prevent the user from easily being able to see a shadow cast by the top of the lens structure. Furthermore, with appropriate selection of the height of the first sidewall, the amount of light exiting from the second surface and from the light output surface can be closer to each other and thus the lens structure can have a better light extraction uniformity. Alternatively, with appropriate selection of the angle between the second sidewall and the first sidewall, the size of the bright ring of the lens structure can also be changed.

An embodiment of the invention also provides a lamp, including at least one lens structure as described above, at least one light source, and a light housing. The light emitted from the light source is refracted and/or reflected by the lens structure, then exits the lens structure, and passes through the lamp housing.

An embodiment of the invention also provides a backlight module, including at least one lens structure as described above, at least one light source, and an optical plate. The light emitted from the light source is refracted and/or reflected by the lens structure, then exits the lens structure, and is converted to planar light by the optical plate.

An embodiment of the invention also provides a display device, including at least one lens structure as described above, at least one light source, an optical plate, and a display panel. The light emitted from the light source is refracted and/or reflected by the lens structure, then exits the lens structure, and is converted to planar light by the optical plate, the planar light being used as a backlight source of the display device.

In order to illustrate the purposes, features, and advantages of the invention, the preferred embodiments and figures of the invention are shown in detail as follows.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1A:
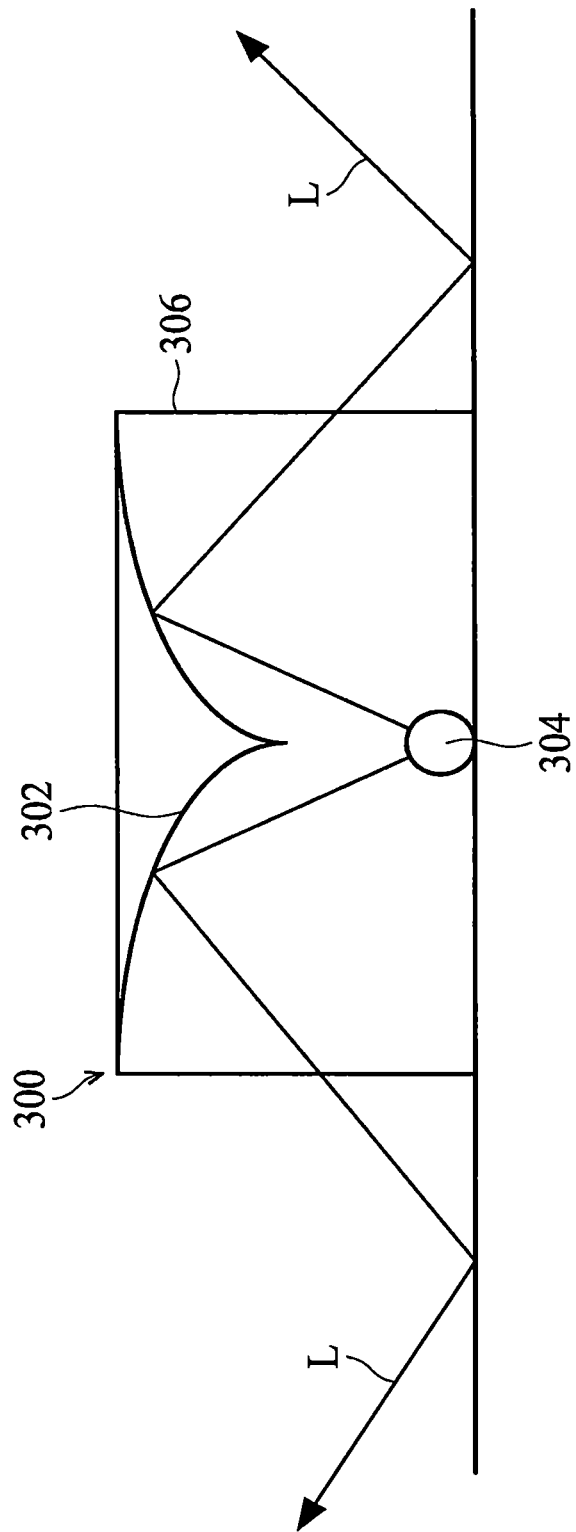
FIG. 1A is a schematic view illustrating the light extraction method of a conventional reflective lens.

First, it should be noted that the lens structures in the following disclosure are applicable to direct-type backlight technology. For example, the lens structure may be used in a direct-type lamp, backlight module, or display device. In addition, the lens structure may also be used in an illumination lamp.

Referring to FIGS. 2A, 2B, 3A and 3B, a lens structure 1 in accordance with an embodiment of the invention includes a first surface 10, a second surface 20, and a light output surface 30. Specifically, as shown in FIGS. 2A to 3B, the first surface 10 is a circular surface, and a circular recess 100 is formed at the center thereof. A convex surface 102 is formed in the recess 100 and protrudes toward a light source S (see FIG. 4). On the other hand, the second surface 20 is opposite the first surface 10 and forms a depression. The light output surface 30 connects the first surface 10 and the second surface 20, wherein an angle θ1 formed between the light output surface 30 and the first surface 10 and an angle θ2 formed between the light output surface 30 and the second surface 20 can be designed and changed according to usage requirements. Moreover, the light output surface 30 is an inclined surface with a single slope, but the invention is not limited to this design.

The lens structure 1 also includes an optical axis O, wherein the lens structure 1 is symmetric with respect to the optical axis O. More specifically, in this embodiment, the convex surface 102 on the first surface 10 of the lens structure 1 has a most convex point located on the optical axis O, and an inclination angle α of the convex surface 102 with respect to the optical axis O is progressively decreasing from the position close to the optical axis O to the position away from the optical axis O. The second surface 20 of the lens structure 1 has a most concave point located on the optical axis O, and an inclination angle β is progressively increasing from the position close to the optical axis O to the position away from the optical axis O.

Figure 4:
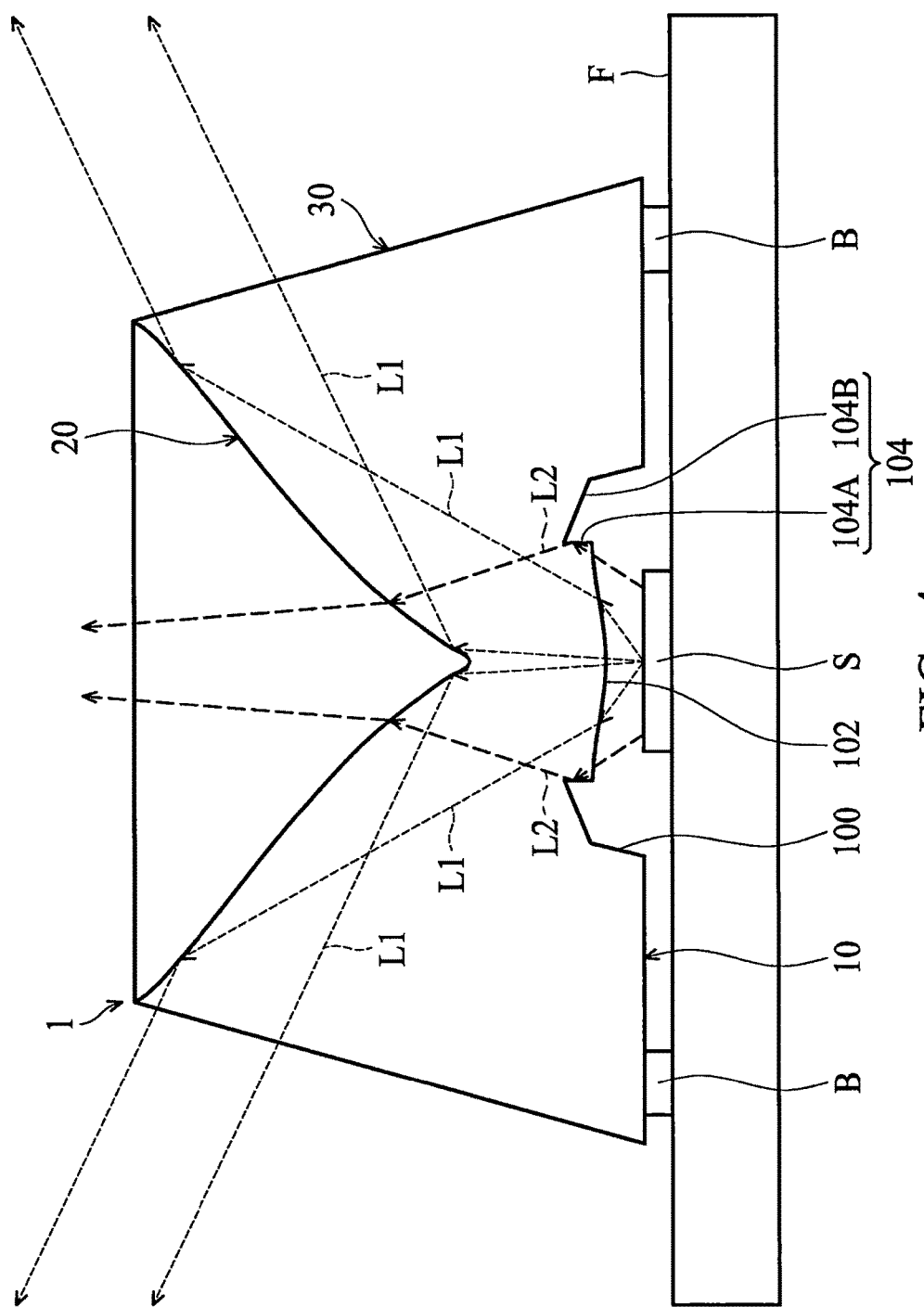
FIG. 4 is a schematic view illustrating the light extraction method of the lens structure in FIG. 2A.

Furthermore, referring to FIG. 4, a light source S (e.g. a light-emitting diode) is optically coupled to the lens structure 1. Specifically, in this embodiment, the light source S is disposed on the optical axis O and adjacent to the recess 100 located on the first surface 10 of the lens structure 1. Thus, when the light source S emits light, the light L1 emitted from the center of the light source S (for the sake of simplicity and clarity, only some light L1 emitted from the center of the light sources S is depicted in FIG. 4) travels upward and enters the lens structure 1 through the convex surface 102 in the recess 100. It should be noted that the light L1 can be concentrated by the convex surface 102 onto the second surface 20, then reflected by the second surface 20, and exits the lens structure 1 from the light output surface 30, in this embodiment. Consequently, by the convex surface 102, the light L1 can be converged effectively so that the light extraction efficiency of the lens structure 1 is increased.

Figure 2A:
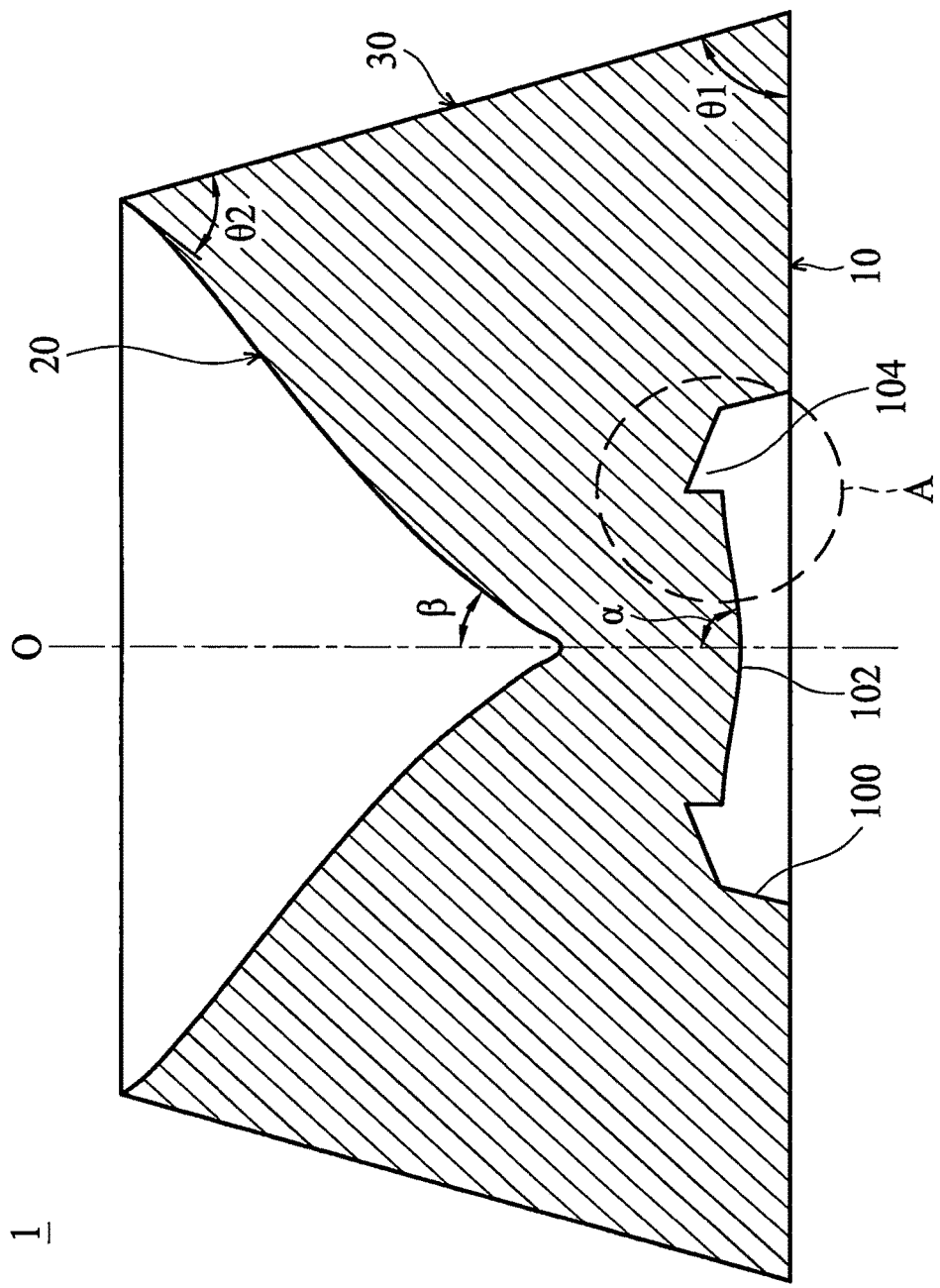
FIG. 2A is a cross-sectional view of a lens structure in accordance with an embodiment of the invention.
Figure 2B:
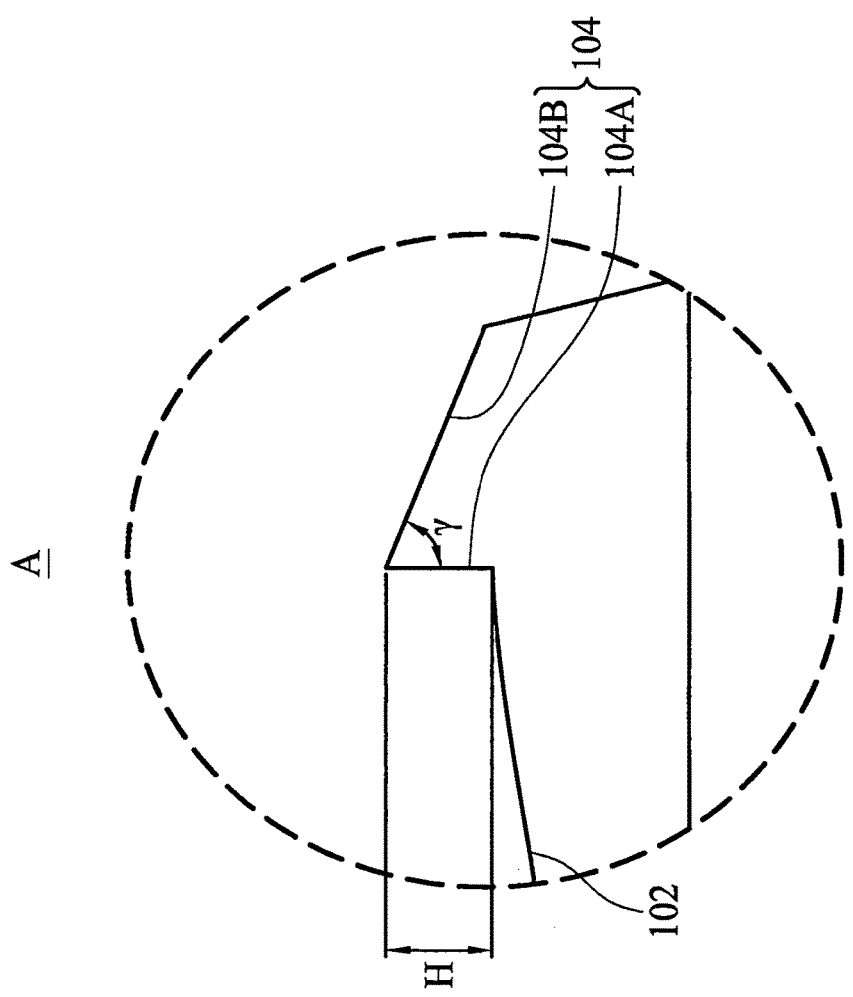
FIG. 2B is an enlarged view of the part A in FIG. 2A.
Figure 3A:
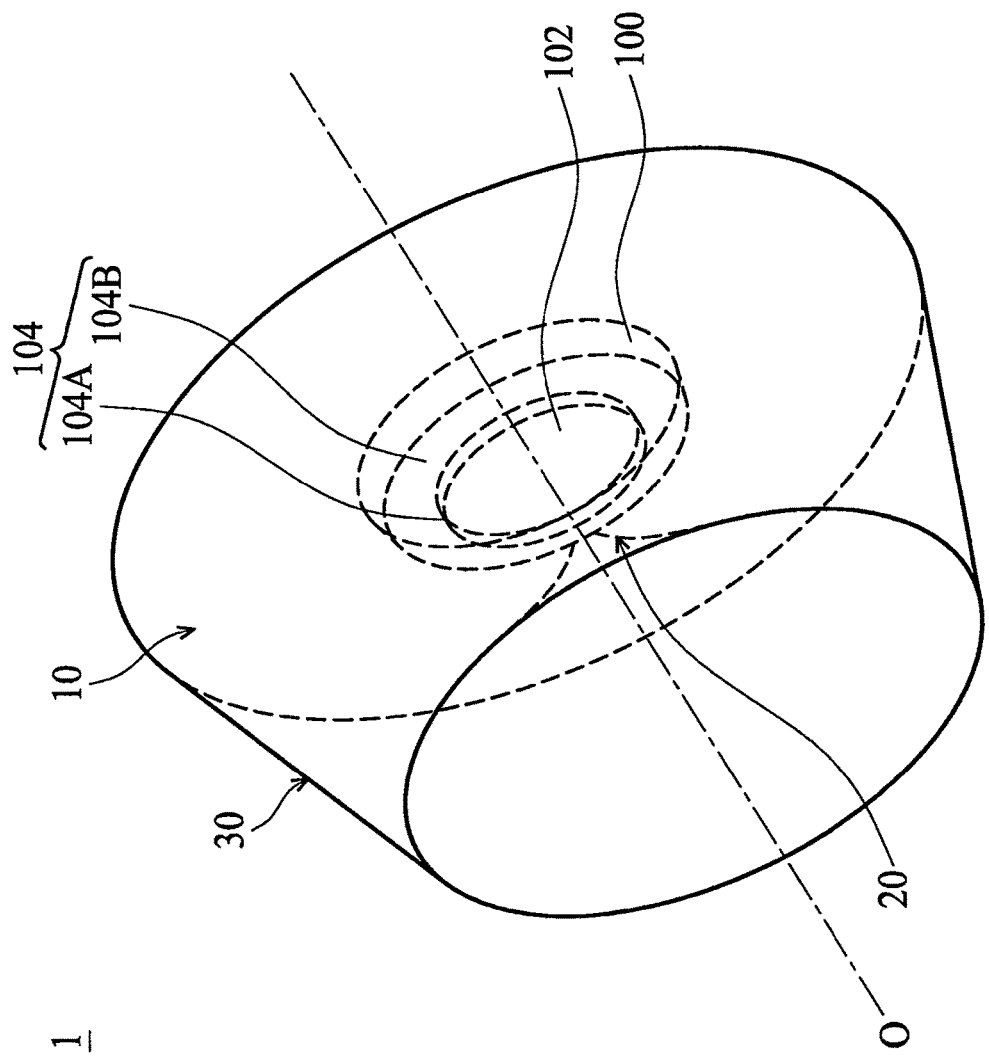
FIG. 3A is a perspective view of the lens structure in FIG. 2A.
Figure 3B:
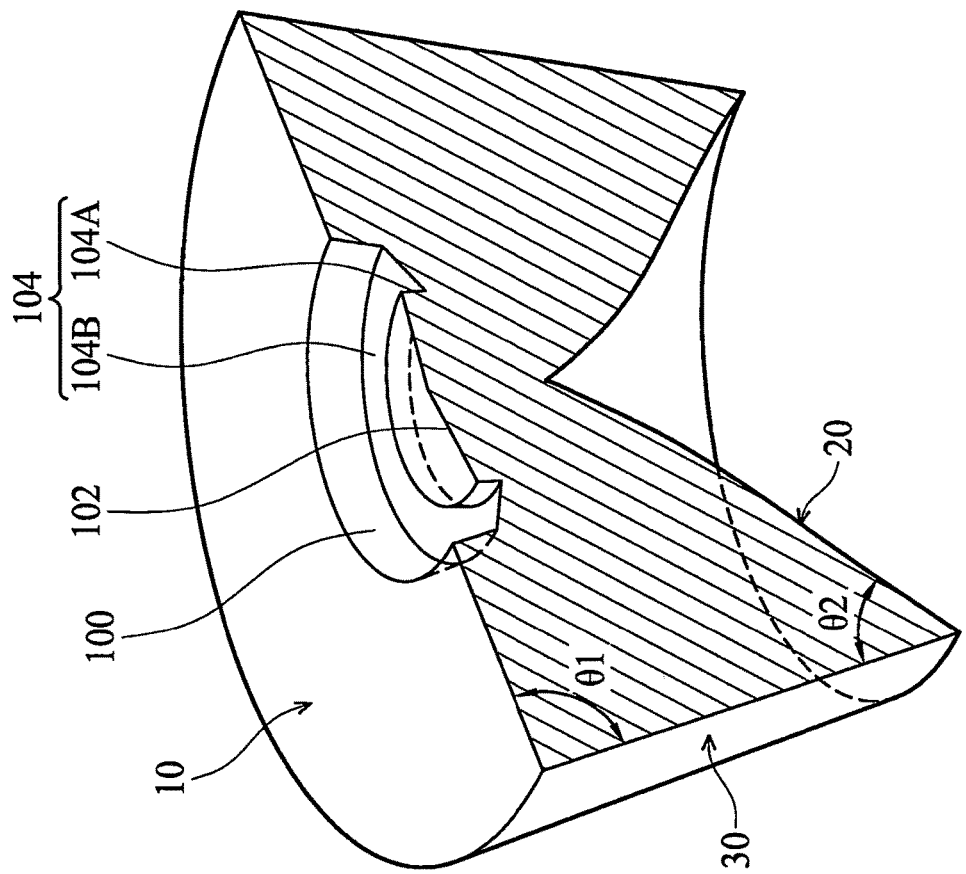
FIG. 3B is a cross-sectional view of the lens structure in FIG. 3A from another viewing angle.

Referring back to FIGS. 2A, 2B, 3A and 3B, in this embodiment, the lens structure 1 further includes an annular groove 104 formed in the recess 100 on the first surface 10 and surrounding the convex surface 102. More specifically, the cross section of the annular groove 104 is a triangle (as shown in FIG. 2B) and includes a first sidewall 104A and a second sidewall 104B, wherein the first sidewall 104A is adjacent to the convex surface 102, and an angle γ is formed between the second sidewall 104B and the first sidewall 104A. Moreover, the first sidewall 104A and the optical axis O of the lens structure 1 are arranged in parallel, but the invention is not limited to this arrangement.

Therefore, when the light source S emits light (see FIG. 4), the light L2 emitted from the non-center places of the light source S (for the sake of simplicity and clarity, only some light L2 emitted from the non-center places of the light sources S is depicted in FIG. 4) enters the lens structure 1 through the convex surface 102 in the recess 100, then it can be reflected by the first sidewall 104A of the annular groove 104 to travel upward and pass through the second surface 20 and then exit the lens structure 1.

Figure 1B:
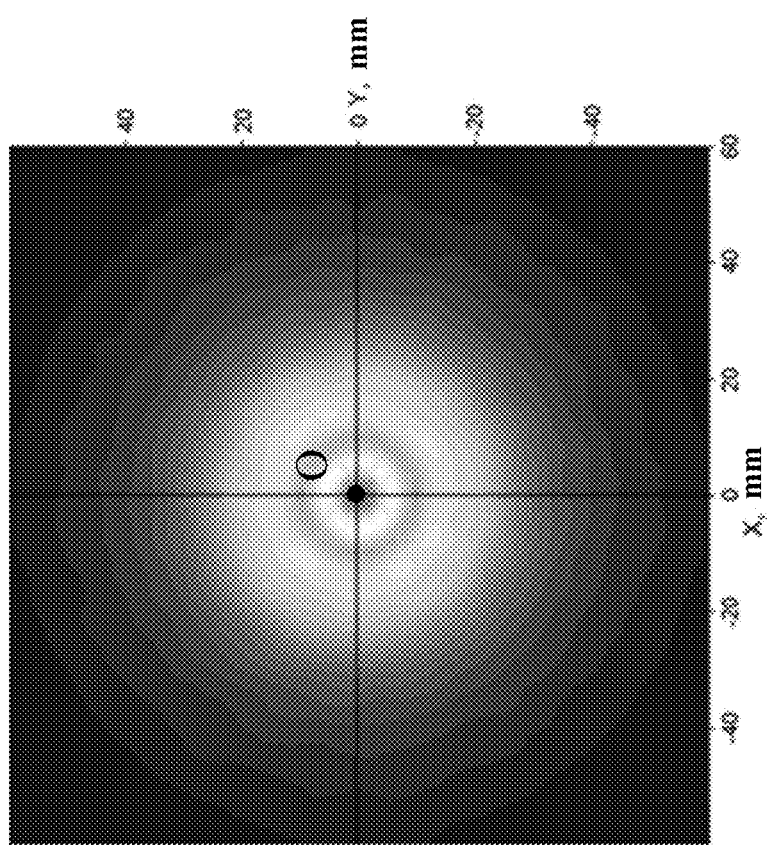
FIG. 1B is a lighting pattern simulation viewed from the top of the conventional reflective lens in FIG. 1A.
Figure 1C:
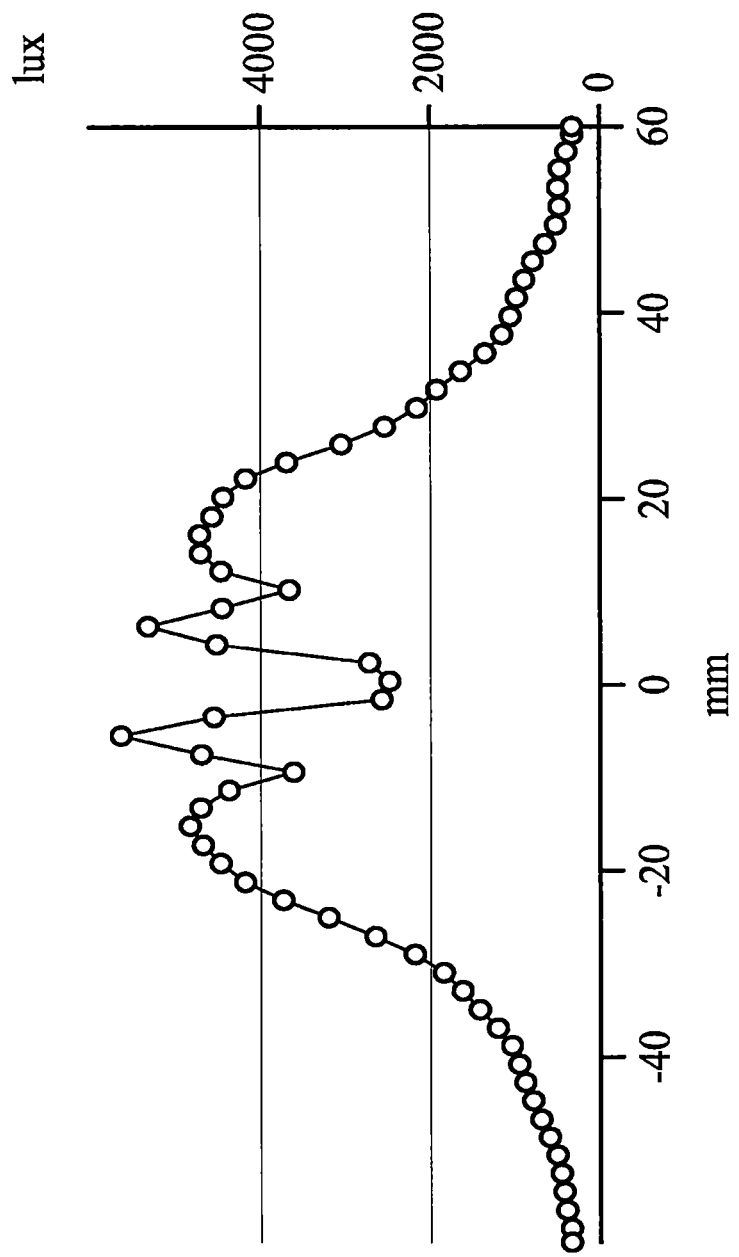
FIG. 1C illustrates the relationship between the illuminance and distance (in X direction or Y direction) of the conventional reflective lens in FIG. 1B.
Figure 5A:
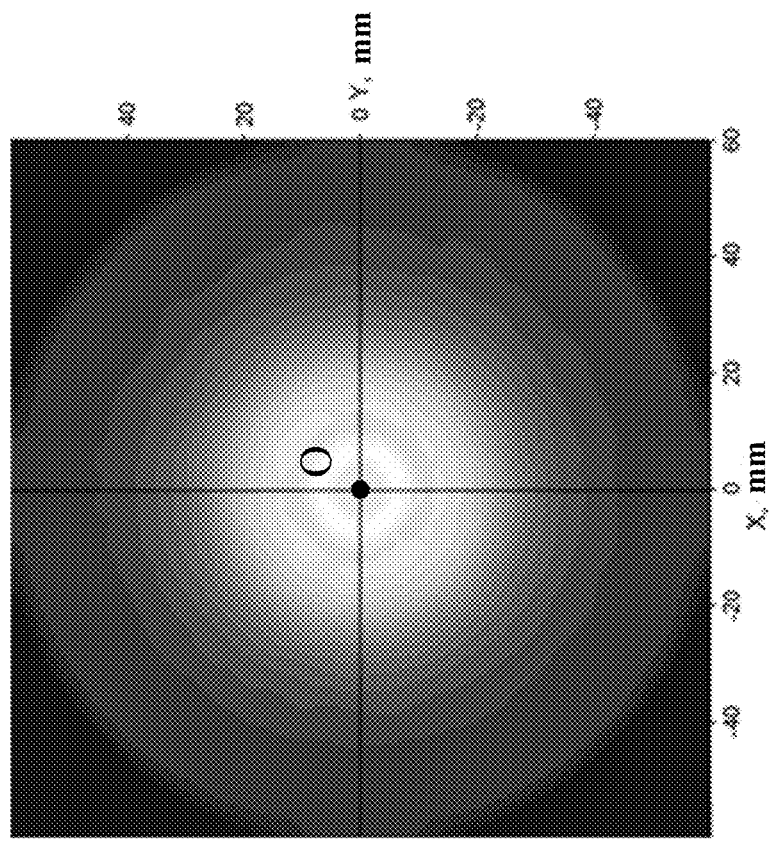
FIG. 5A is a lighting pattern simulation viewed from the top of the lens structure in FIG. 2A.
Figure 5B:
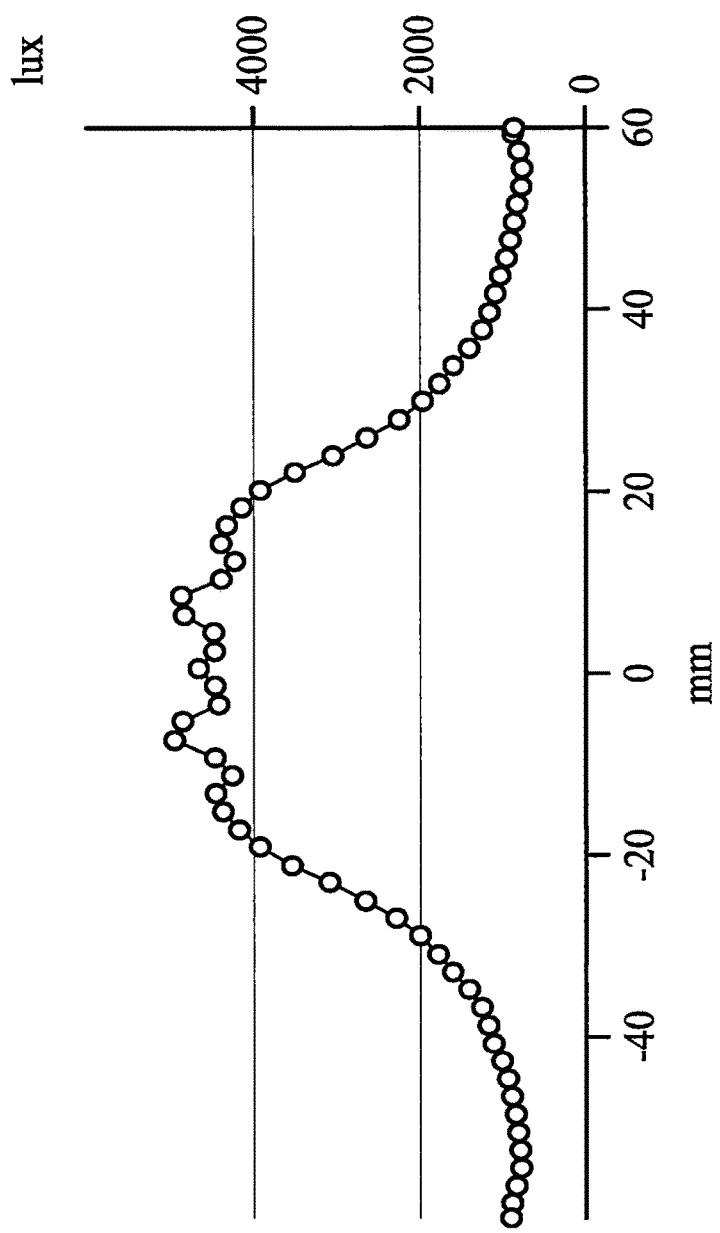
FIG. 5B illustrates the relationship between the illuminance and distance (in X direction or Y direction) of the lens structure in FIG. 5A.

In particular, by (the first sidewall 104A of) the annular groove 104, some light emitted from the light source S can pass through the second surface 20 to exit the lens structure 1 (it is equivalent to having some lighting effects like the refractive lens). Thus, the light extraction uniformity of the lens structure can be improved, and the user will also not easily see a shadow cast by the top of the lens structure 1. It can be seen from FIGS. 5A and 5B that the illuminance (in lux) is quite uniform on the top of the lens structure 1, that is, the shadow problem in conventional lighting is improved. Conversely, in the conventional reflective lens 300 in FIG. 1A, the light L is unable to pass (upward) through the TIR surface 302, so that the user will see a shadow cast by the top of the conventional reflective lens 300. It can be seen from FIGS. 1B and 1C that the illuminance (in lux) is obviously non-uniform on the top of the conventional reflective lens 300, that is, the shadow problem exists.

Figure 6A:
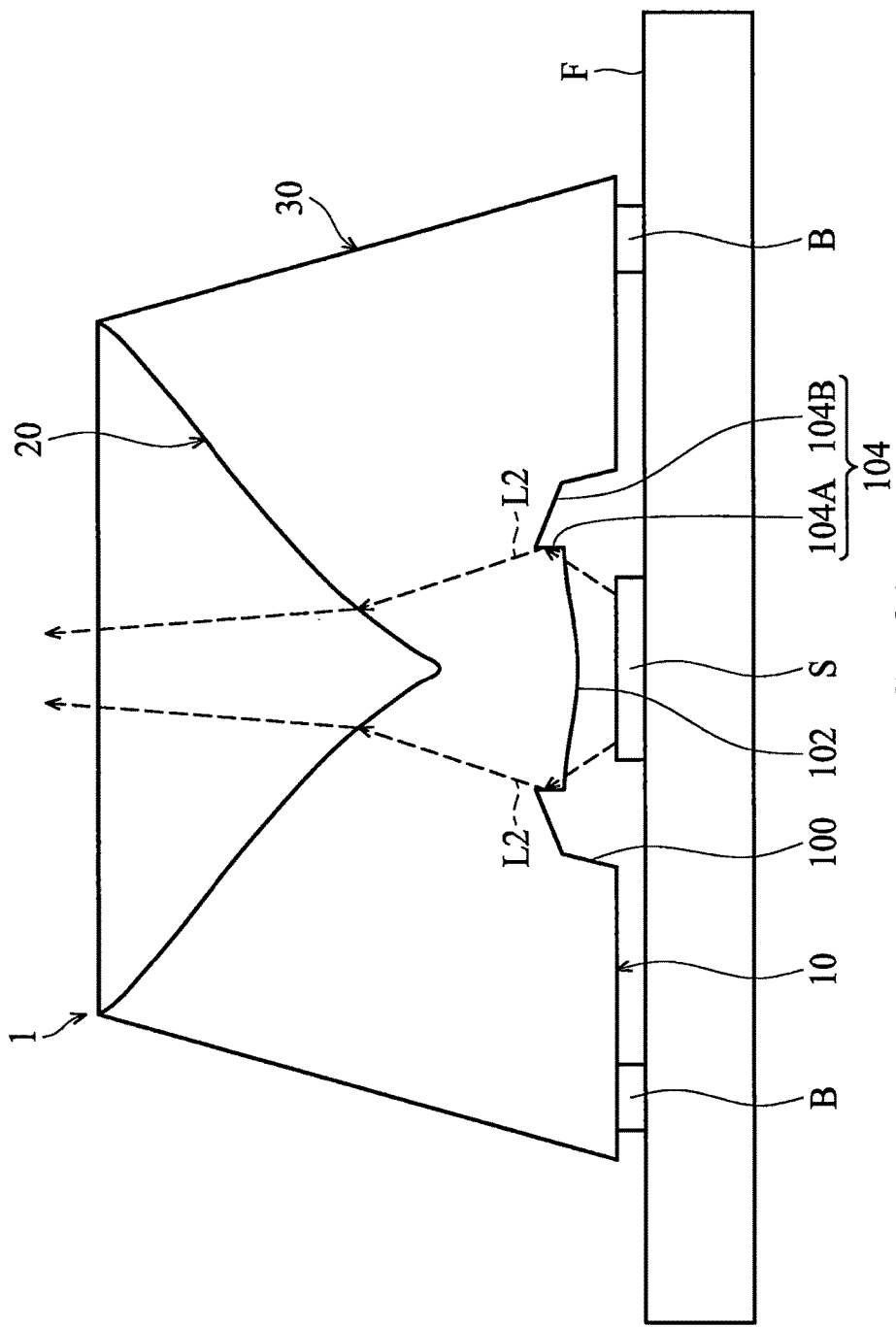
FIG. 6A is a schematic view illustrating the light extraction method of the lens structure as the height of the first sidewall of the annular groove is lower.
Figure 6B:
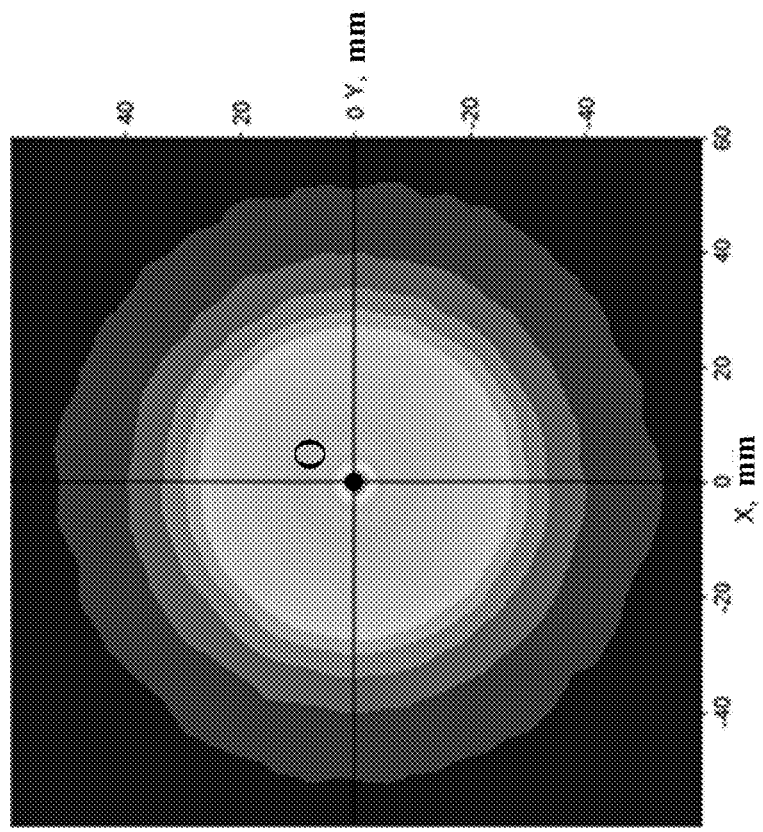
FIG. 6B is a lighting pattern simulation viewed from the top of the lens structure in FIG. 6A.
Figure 6C:
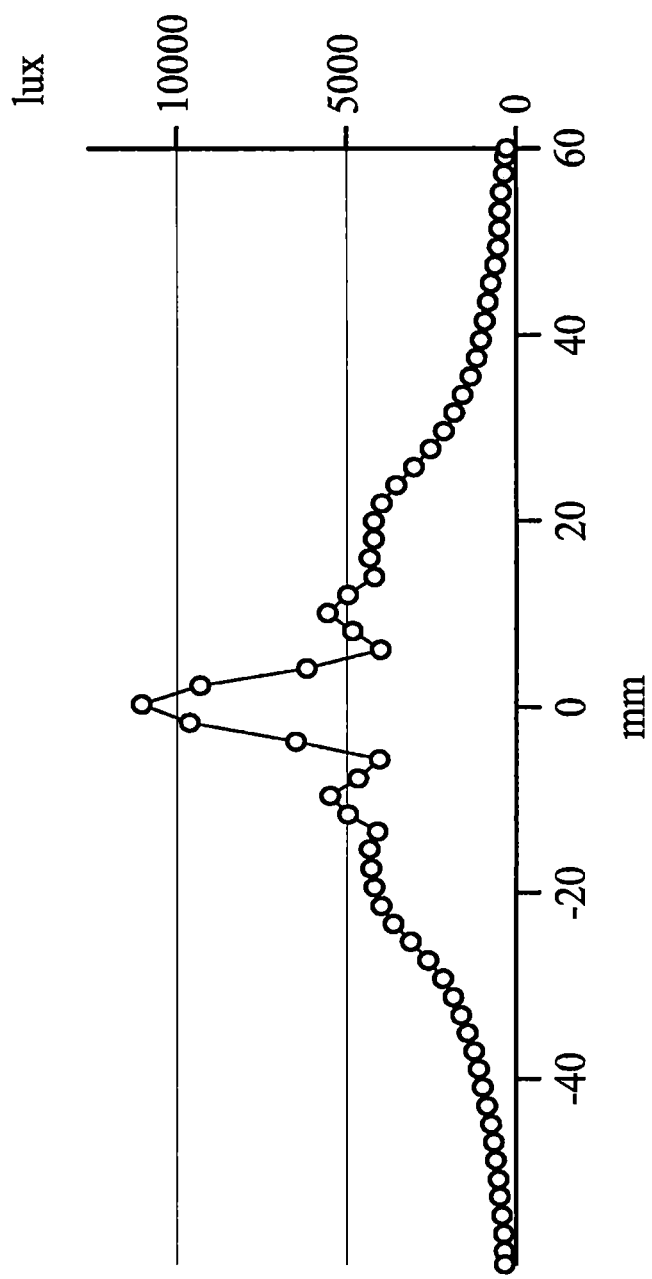
FIG. 6C illustrates the relationship between the illuminance and distance (in X direction or Y direction) of the lens structure in FIG. 6B.
Figure 7A:
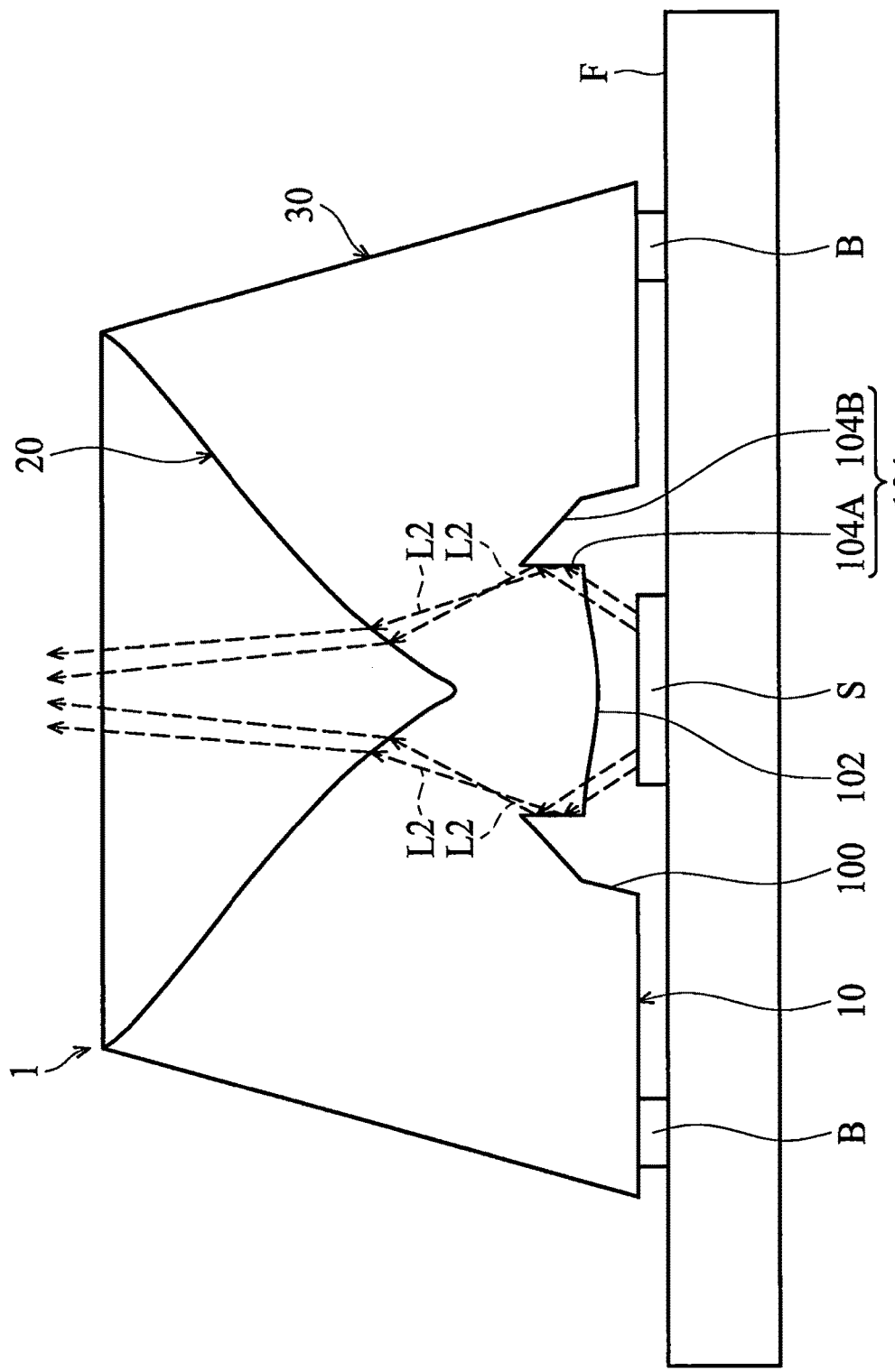
FIG. 7A is a schematic view illustrating the light extraction method of the lens structure as the height of the first sidewall of the annular groove is higher.
Figure 7B:
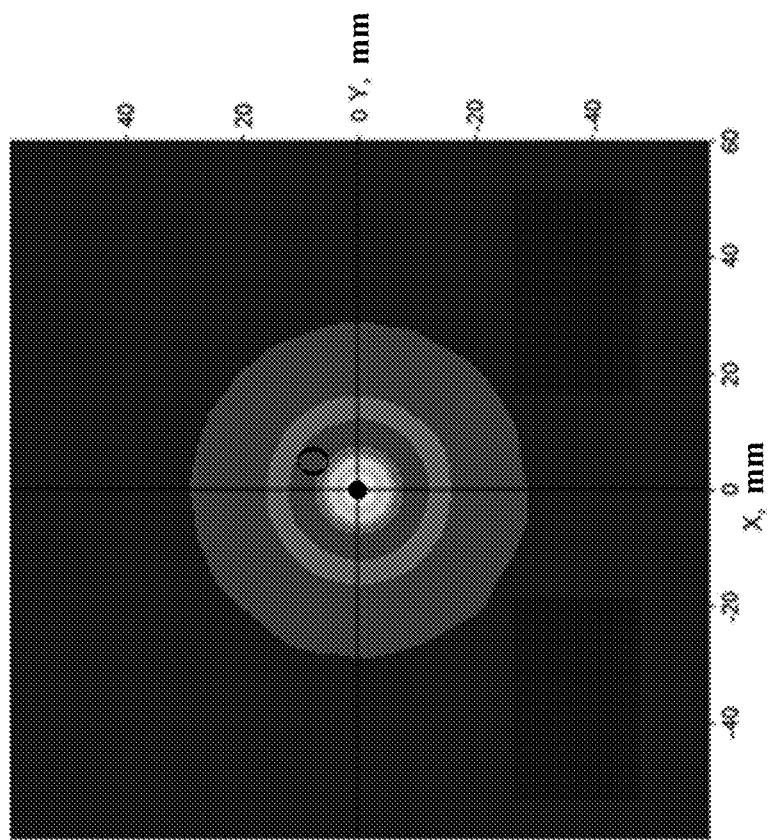
FIG. 7B is a lighting pattern simulation viewed from the top of the lens structure in FIG. 7A.
Figure 7C:
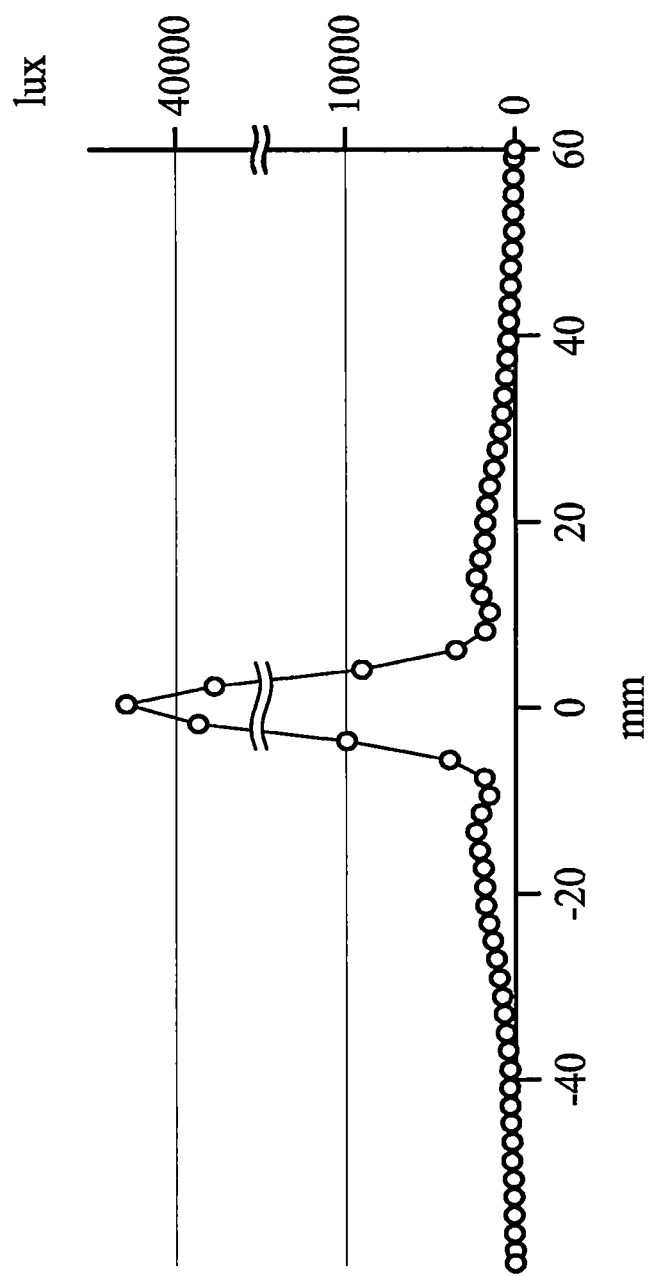
FIG. 7C illustrates the relationship between the illuminance and distance (in X direction or Y direction) of the lens structure in FIG. 7B.

Referring to FIGS. 6A and 7A together, in this embodiment, the higher the height H (see FIG. 2B) of the first sidewall 104A of the annular groove 104, the greater the amount of light (as represented by the amount of light L2) exiting from the second surface 20. In other words, the amount of light exiting from the second surface 20 is affected by the height H of the first sidewall 104A, and they are in positive relation. Moreover, referring to FIGS. 6B, 6C, 7B and 7C together, the lower the height H (see FIGS. 6B and 6C) of the first sidewall 104A of the annular groove 104, the more divergent light pattern (with respect to the light axis O) can be seen from the top of the lens structure 1 and the illuminance is lower; whereas, the higher the height H (see FIGS. 7B and 7C) of the first sidewall 104A of the annular groove 104, the more concentrated light pattern (with respect to the light axis O) can be seen from the top of the lens structure 1 and the illuminance is higher. As a result, by appropriately selecting the height H of the first sidewall 104, the amount of light exiting from the second surface 20 and from the light output surface 30 can be closer to each other, so that the lens structure 1 can have a better light extraction uniformity.

Figure 8A:
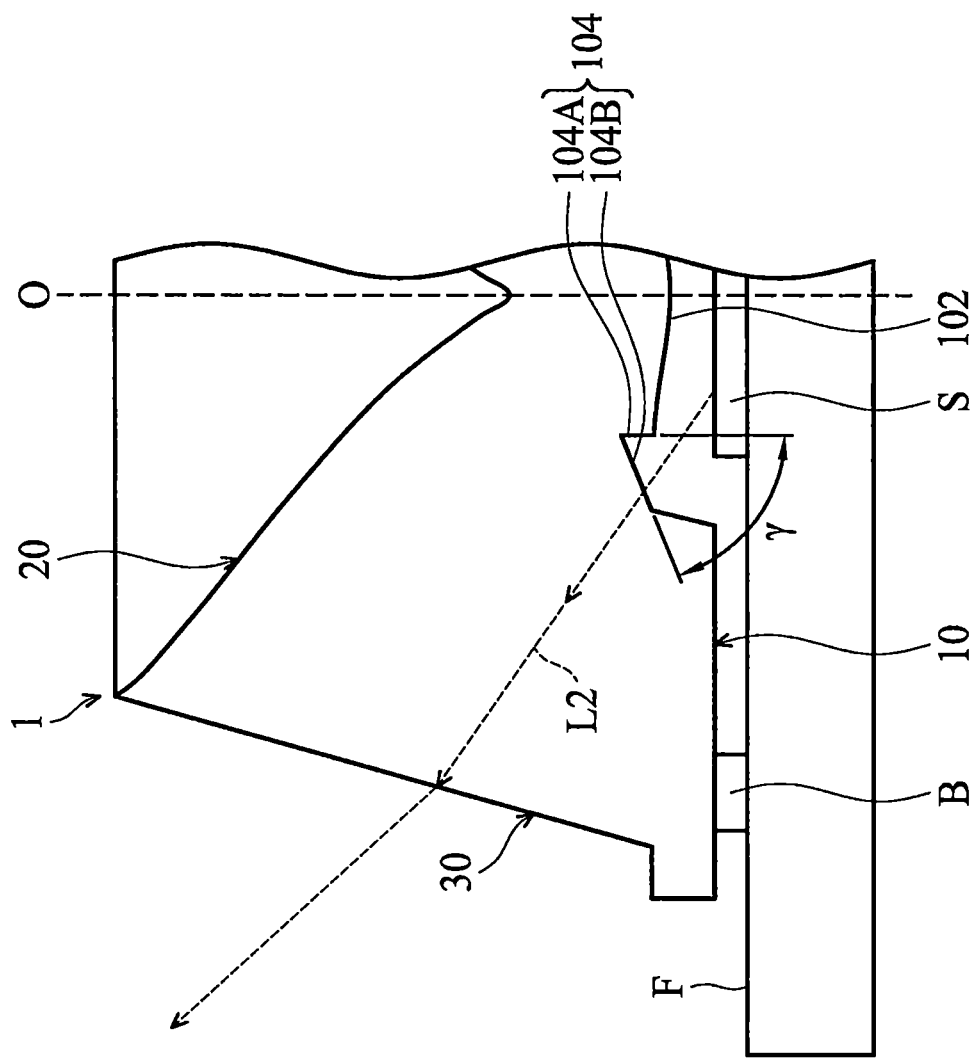
FIG. 8A is a schematic view illustrating the light extraction method of the lens structure as the angle between the second sidewall and the first sidewall of the annular groove is smaller.
Figure 8B:
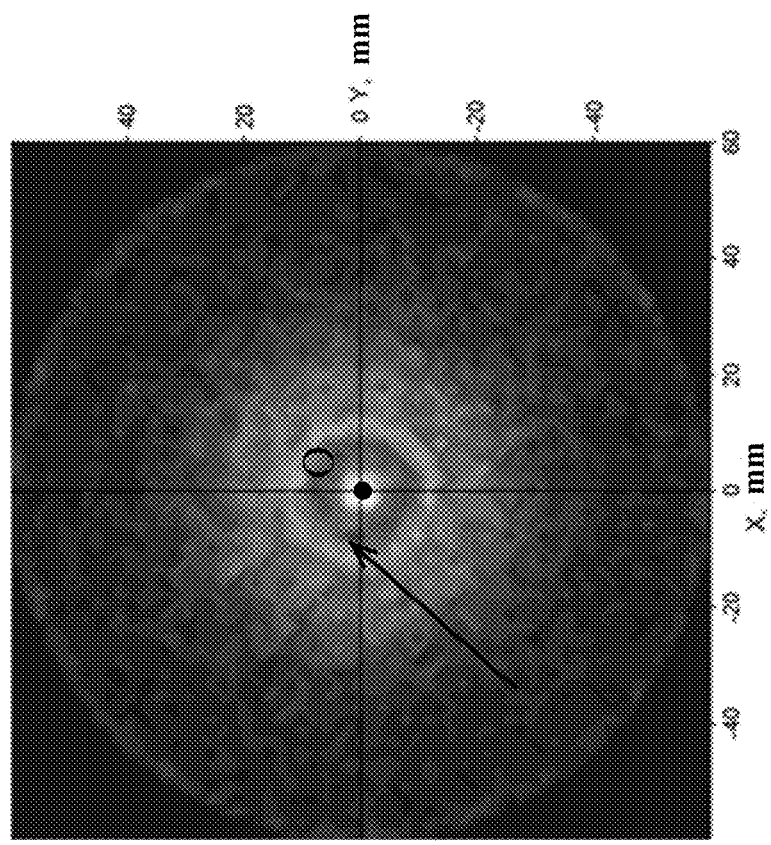
FIG. 8B is a lighting pattern simulation viewed from the top of the lens structure in FIG. 8A.
Figure 8C:
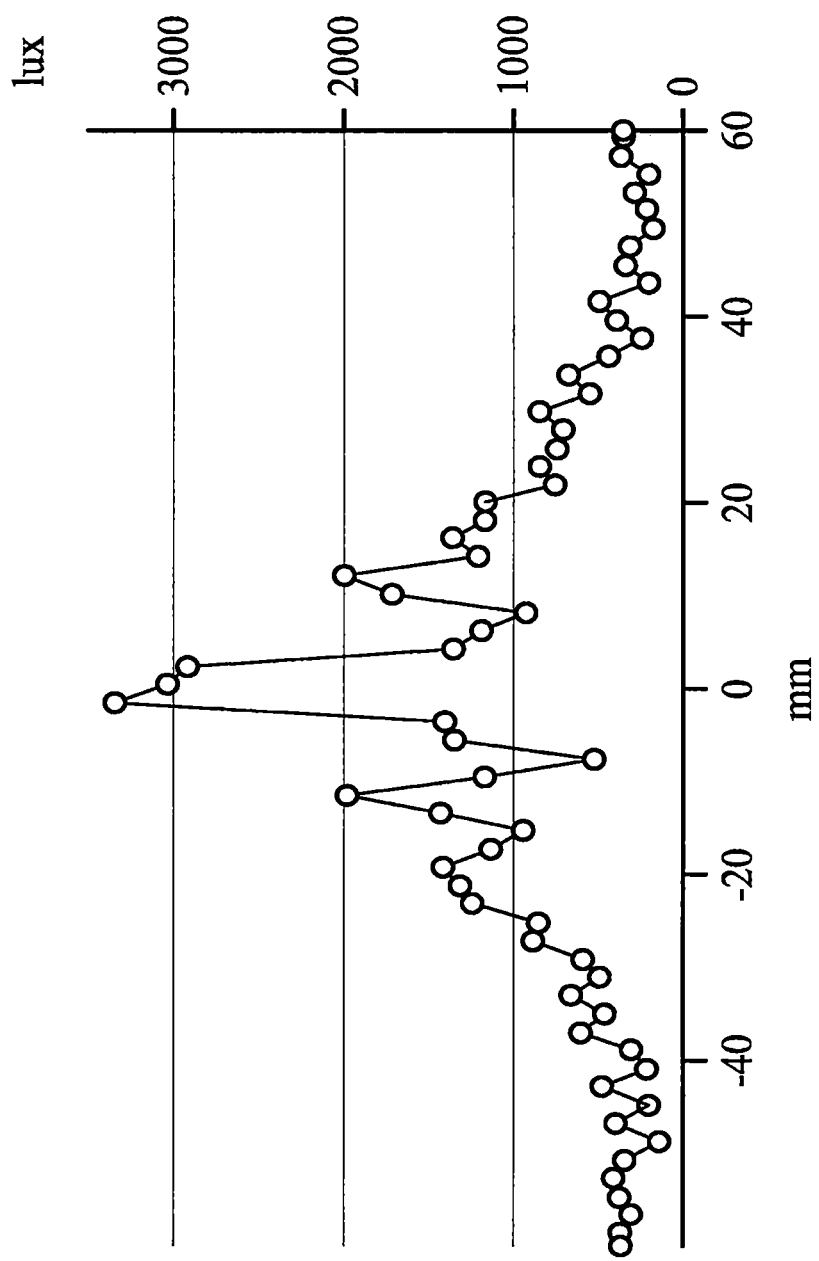
FIG. 8C illustrates the relationship between the illuminance and distance (in X direction or Y direction) of the lens structure in FIG. 8B.
Figure 9A:
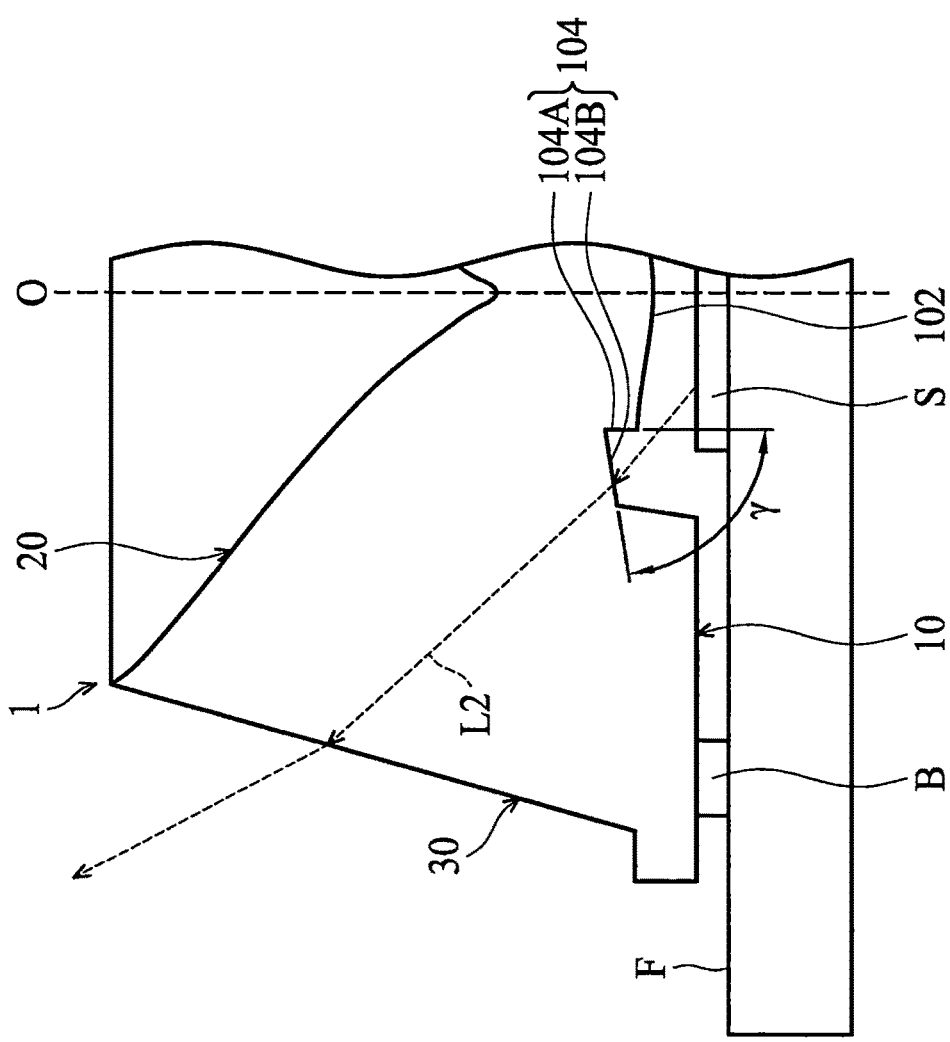
FIG. 9A is a schematic view illustrating the light extraction method of the lens structure as the angle between the second sidewall and the first sidewall of the annular groove is larger.
Figure 9B:
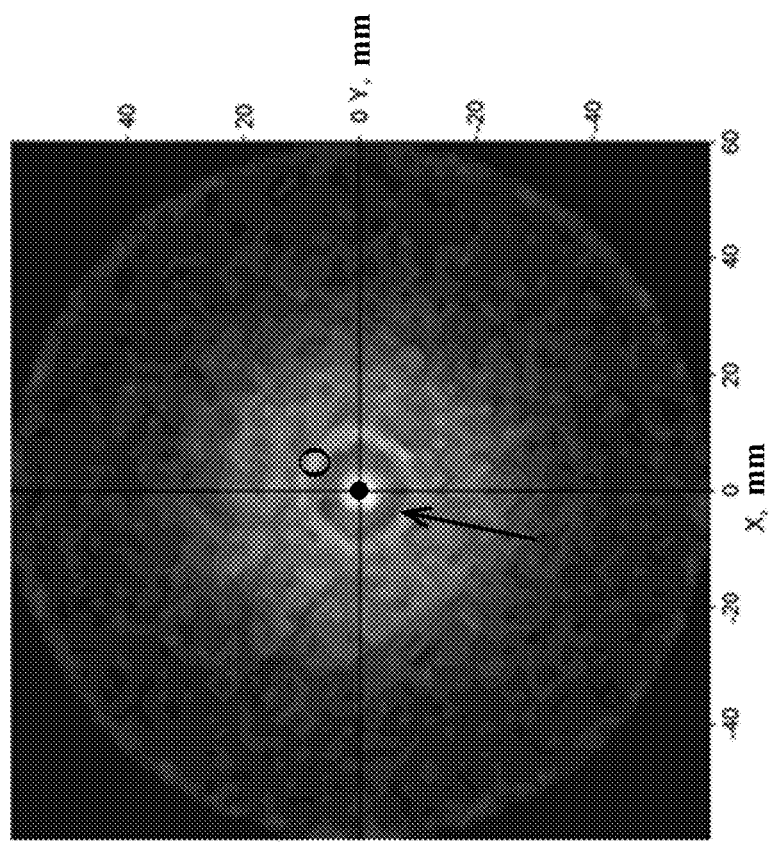
FIG. 9B is a lighting pattern simulation viewed from the top of the lens structure in FIG. 9A.
Figure 9C:
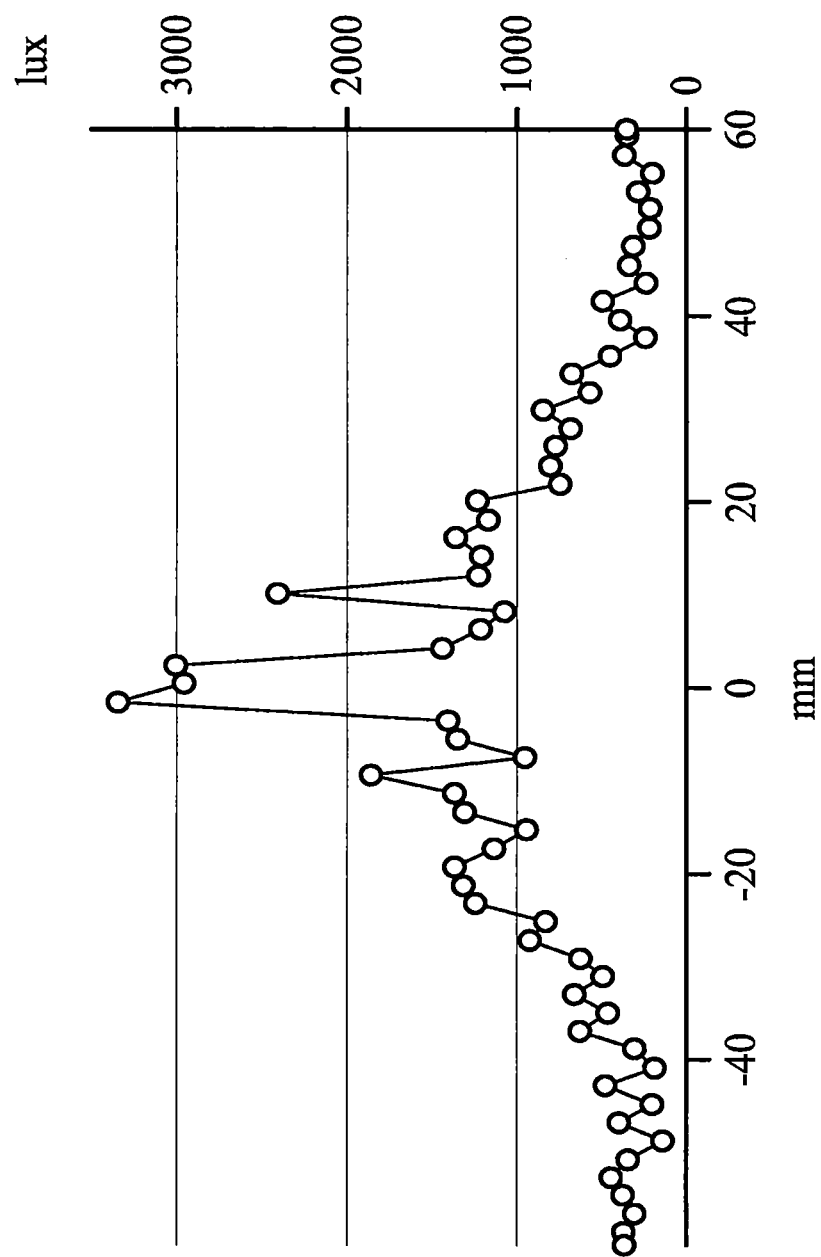
FIG. 9C illustrates the relationship between the illuminance and distance (in X direction or Y direction) of the lens structure in FIG. 9B.

Referring to FIG. 8A, when the light source S emits light, the light L2 emitted from the non-center places of the light source S (for the sake of simplicity and clarity, only some light L2 emitted from the non-center places of the light sources S is depicted in FIG. 8A) may also enter the lens structure 1 through the second sidewall 104B of the annular groove 104 and directly exit the lens structure 1 from the light output surface 30 (rather than being reflected further by the second surface 20). Moreover, referring to FIGS. 8A to 9C together, as the angle γ (see FIG. 9A) between the second sidewall 104B and the first sidewall 104A is larger, a light output position of the light exiting from the light output surface 30 is shifted close to the optical axis O and the bright ring (as the arrow indicates in FIG. 9B) is smaller; whereas, as the angle γ (see FIG. 8A) is smaller, a light output position of the light exiting from the light output surface 30 is shifted away from the optical axis O and the bright ring (as the arrow indicates in FIG. 8B) is larger. In other words, the distance between the light output position of the light exiting from the light output surface 30 and the optical axis O of the lens structure is affected by the angle γ between the second sidewall 104B and the first sidewall 104A, and they are in negative relation. As a result, by appropriately selecting the angle γ between the second sidewall 104B and the first sidewall 104A, the size of the bright ring of the lens structure 1 can also be changed.

Referring back to the embodiment of FIG. 4, the light source S is disposed outside of the recess 100 located on the first surface 10 of the lens structure 1. More specifically, the light source S is disposed in a space (that is formed by the feet B protruded from the first surface 10 lifting up the lens structure 1) between the first surface 10 and a supporting surface F, but the invention is not limited to this arrangement. In some embodiments, the light source S may also be disposed in the recess 100, and the feet B on the first surface 10 are omitted.

Figure 10:
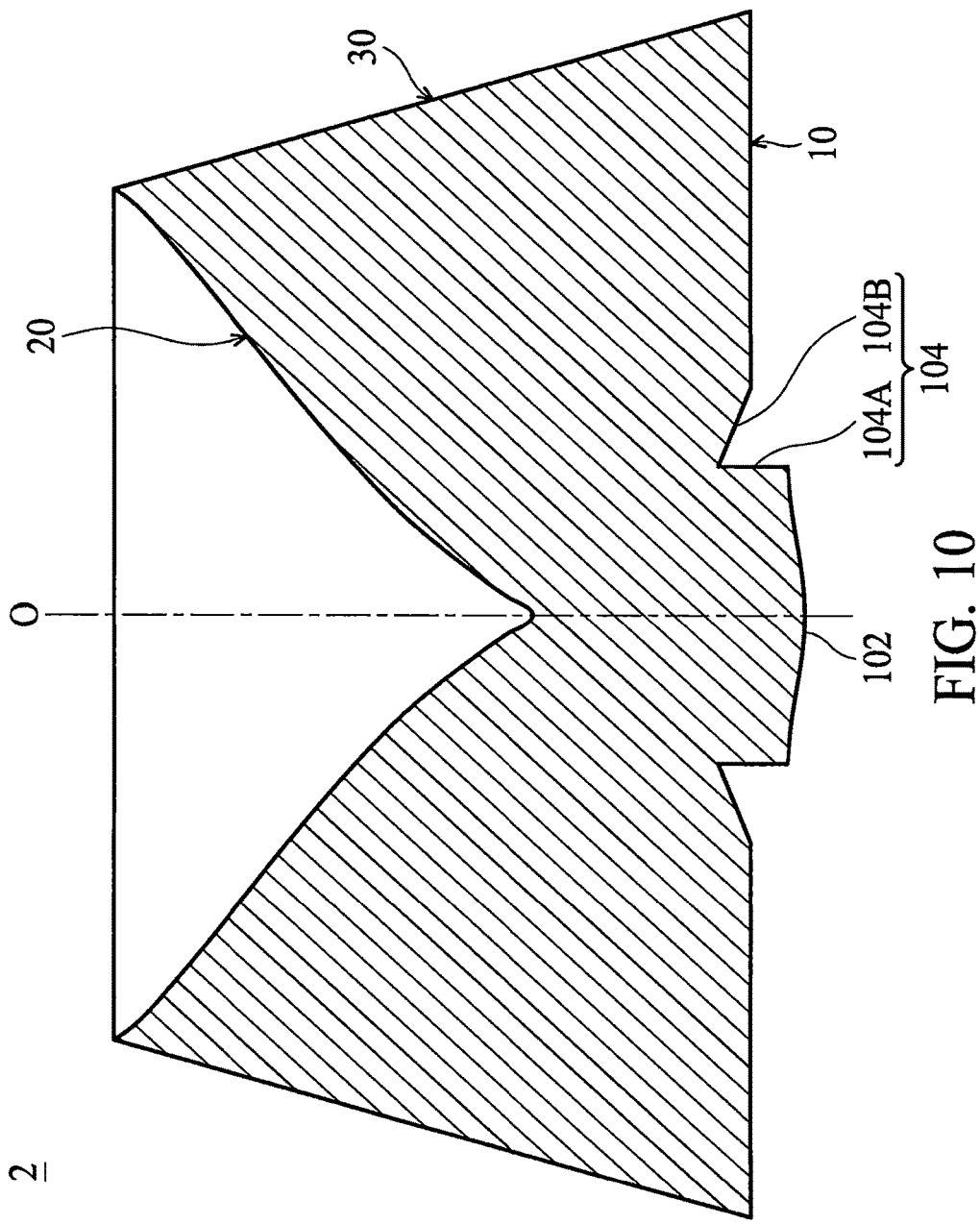
FIG. 10 is a cross-sectional view of a lens structure in accordance with another embodiment of the invention.

FIG. 10 is a cross-sectional view of a lens structure 2 in accordance with another embodiment of the invention. As shown in FIG. 10, the lens structure 2 includes a first surface 10, a second surface 20, and a light output surface 30. Specifically, the first surface 10 is a circular surface, and a convex surface 102 is formed at the center thereof, wherein the convex surface 102 protrudes toward a light source (as per the embodiment in FIGS. 2A to 4 described above). Moreover, an annular groove 104 is also formed on the first surface 10 and surrounding the convex surface 102. More specifically, in this embodiment, the cross section of the annular groove 104 is a triangle and includes a first sidewall 104A and a second sidewall 104B, wherein the first sidewall 104A is adjacent to the convex surface 102, and an angle is formed between the second sidewall 104B and the first sidewall 104A. Note that the design of the second surface 20 and the light output surface 30 of the lens structure 2 is the same as or similar to the aforementioned embodiments, and the difference is that the convex surface 102 and the annular groove 104 of the lens structure 2 are directly formed on the first surface 10 (no recess is formed on the first surface 10). The optical effect that the lens structure 2 can achieve is substantially the same as the lens structure 1 of the embodiments described above.

Figure 11A:
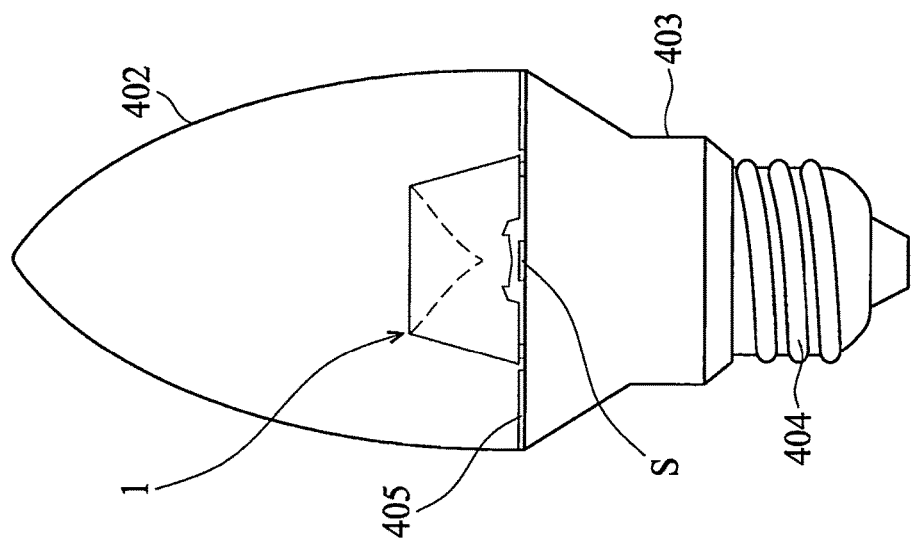
FIG. 11A is a schematic view of a lamp in accordance with another embodiment of the invention.

Referring to FIG. 11A, which is a schematic view of a lamp 400 in accordance with another embodiment of the invention. As shown in FIG. 11A, the lamp 400 includes a lamp cover 402, a lamp socket 403, a lamp socket adaptor 404, a lens structure 1 described in the above embodiment (see FIG. 4), a light source S, and a reflecting plate 405. The lamp cover 402, the lamp socket 403 and the lamp socket adaptor 404 are combined into a lamp housing. The lamp cover 402 and the lamp socket 403 are adapted to form a receiving space therebetween. The lamp socket adaptor 404 is disposed at the bottom of the lamp socket 403. The lens structure 1 and the light source S are disposed on a supporting surface F (a circuit board may be provided on the supporting surface F for electrically connecting the light source S) of the lamp socket 403 adjacent to the lamp cover 402. The reflecting plate 405 covers the supporting surface F for reflecting a part of light exiting from the lens structure 1 to pass through the lamp cover 402 of the lamp 400 (not shown). Note that the lens structure 1 may also be replaced by the lens structure 2 in FIG. 10, and the light emitted from the light source S can be refracted and/or reflected by the lens structure 1 (or lens structure 2), and then exit the lens structure 1 (or lens structure 2).

Figure 11B:
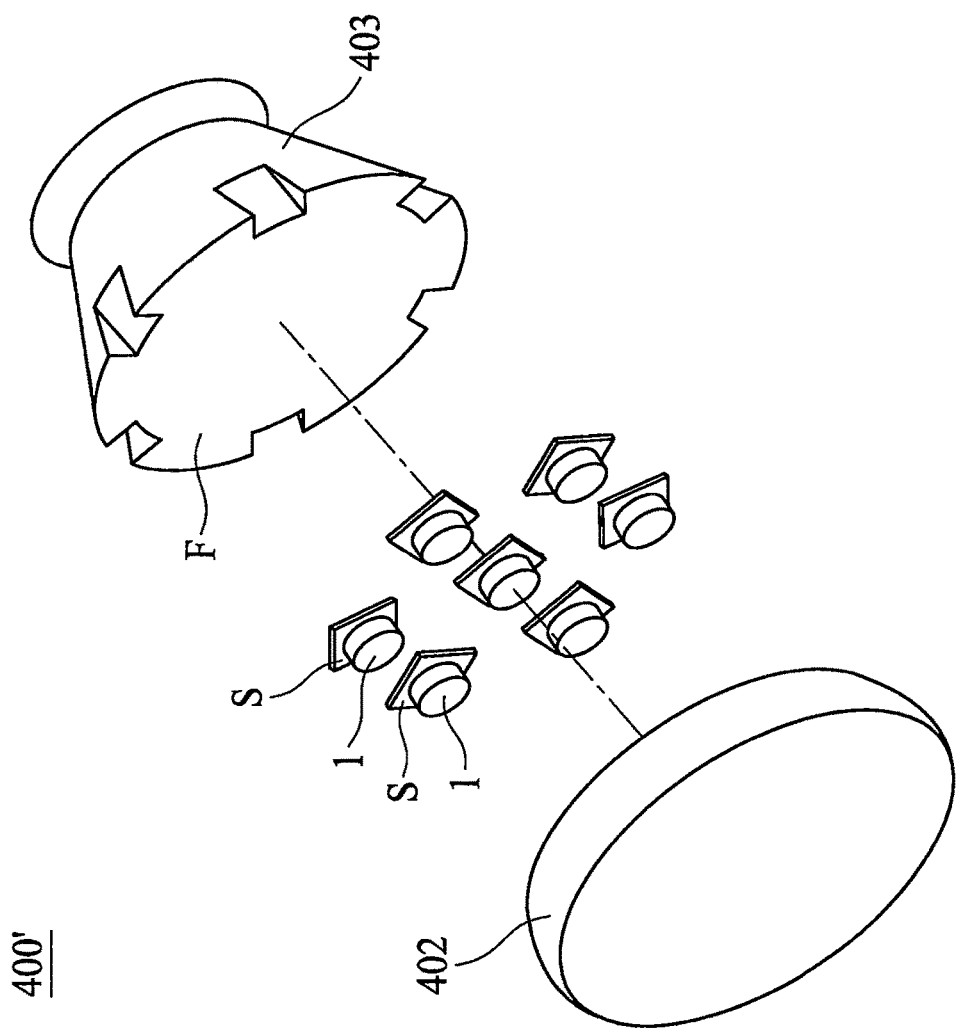
FIG. 11B is a schematic view of a lamp in accordance with another embodiment of the invention.

Referring to FIG. 11B, which is a schematic view of a lamp 400' in accordance with another embodiment of the invention. As shown in FIG. 11B, the lamp 400' includes a lamp cover 402, a lamp socket 403, a plurality of lens structures 1 described in the above embodiment (see FIG. 4), and a plurality of light sources S. Similarly, in this embodiment, the lamp cover 402 and the lamp socket 403 are combined into a lamp housing and adapted to form a receiving space therebetween. The lens structures 1 and the light sources S correspond to each other and are disposed on a supporting surface F (a circuit board may be provided on the supporting surface F for electrically connecting the light source S) of the lamp socket 403 adjacent to the lamp cover 402. In addition, each lens structure 1 may also be replaced by the lens structure 2 in FIG. 10, and the light emitted from the light source S can be refracted and/or reflected by the lens structure 1 (or lens structure 2), and then exit the lens structure 1 (or lens structure 2).

Figure 12:
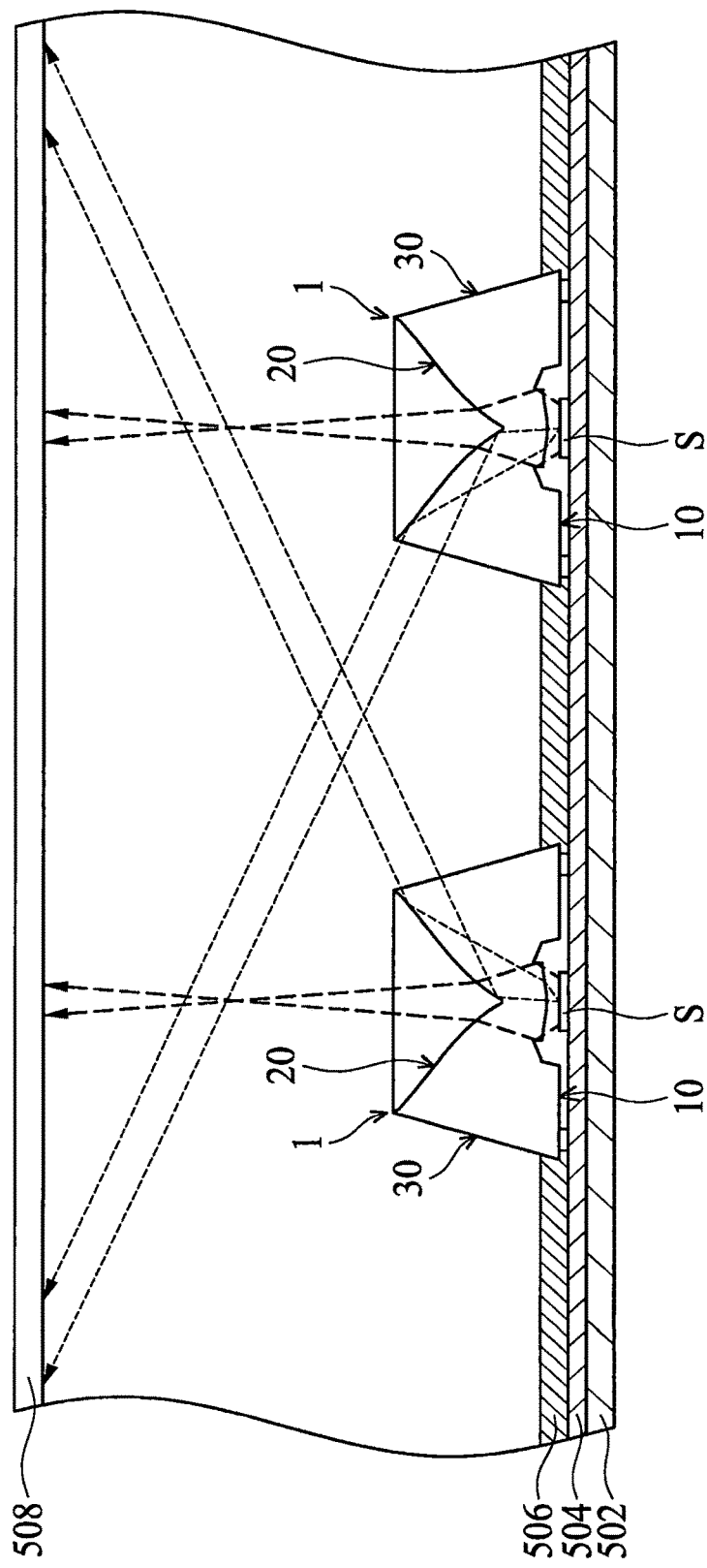
FIG. 12 is a schematic view of a backlight module in accordance with another embodiment of the invention.

Referring to FIG. 12, which is a schematic view of a backlight module 500 in accordance with another embodiment of the invention. As shown in FIG. 12, the backlight module 500 includes a backplate 502, a circuit board 504, at least one (e.g. a plurality of) lens structures 1 described in the above embodiment (see FIG. 4), at least one (e.g. a plurality of) light sources S, a reflecting plate 506, and a diffusing plate 508 (optical plate). The circuit board 504 is disposed on the backplate 502. The lens structures 1 and the light sources S correspond to each other and are disposed on the circuit board 504, and the light sources S electrically connect to the circuit board 504. The reflecting plate 506 is also disposed on the circuit board 504 for reflecting a part of light exiting from the lens structure 1 upward (not shown), so as to increase the lighting efficiency of the backlight module 500. The diffusing plate 508 is disposed above the lens structures 1 (i.e. at the light output side of the backlight module 500) and used to improve the light extraction uniformity of the backlight module 500 (make the backlight module 500 have a planar-light output). Note that each lens structure 1 may also be replaced by the lens structure 2 in FIG. 10, and the light emitted from the light source S can be refracted and/or reflected by the lens structure 1 (or lens structure 2), and then exit the lens structure 1 (or lens structure 2).

Figure 13:
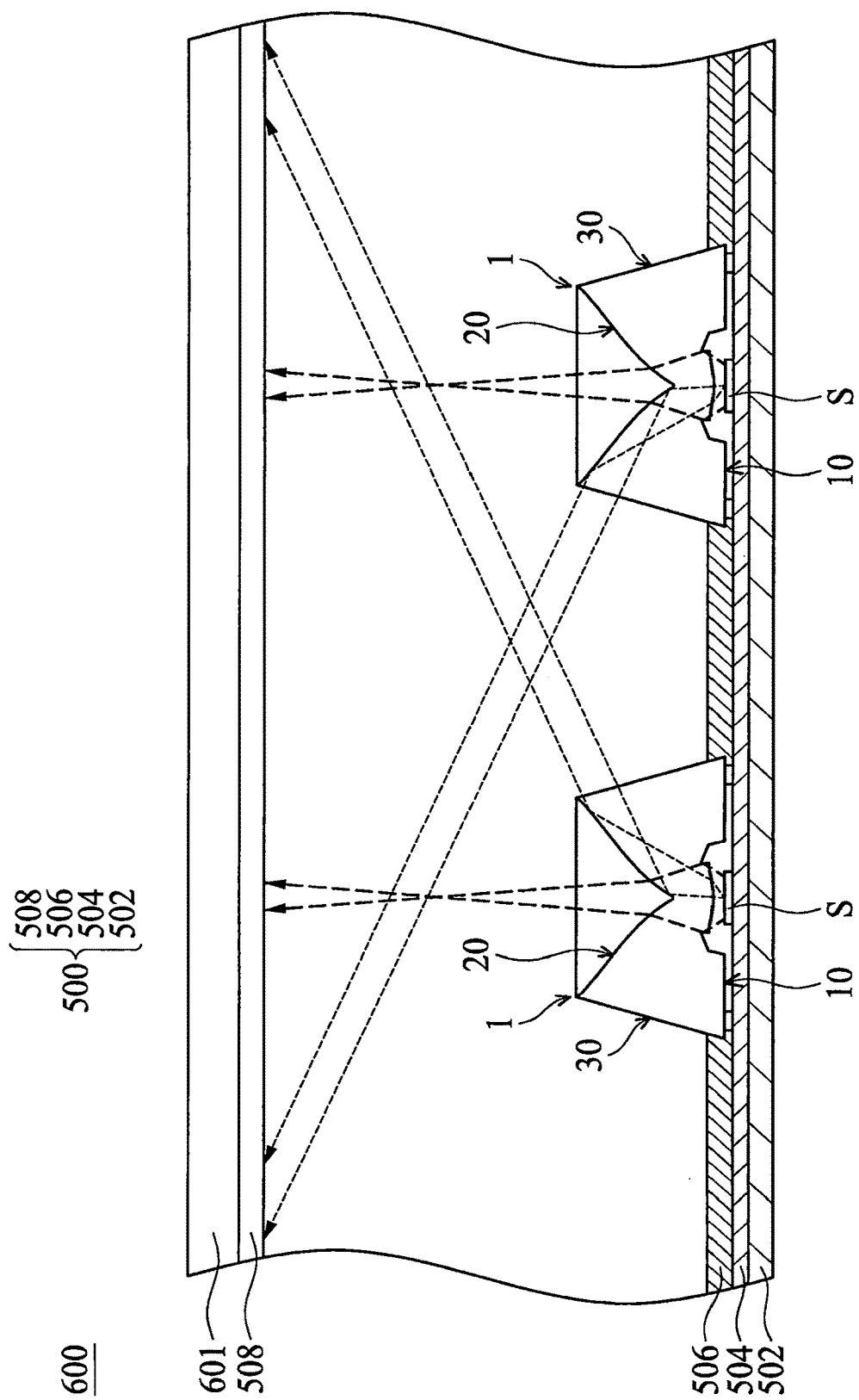
FIG. 13 is a schematic view of a display device in accordance with another embodiment of the invention.

Referring to FIG. 13, which is schematic view of a display device 600 in accordance with another embodiment of the invention. As shown in FIG. 13, the display device 600 includes a backlight module 500 described in the above embodiment (FIG. 12) and a display panel 601 (e.g. a liquid-crystal display panel) disposed at the light output side of the backlight module 500, wherein the backlight module 500 is used as a backlight source of the display panel 601. In some embodiments, each lens structure 1 in the backlight module 500 may also be replaced by the lens structure 2 in FIG. 10, and the light emitted from the light source S can be refracted and/or reflected by the lens structure 1 (or lens structure 2), and then exit the lens structure 1 (or lens structure 2).

As mentioned above, in the lens structure and the lamp, backlight module, and display device using the lens structure provided in the embodiments of the invention, the light L1 can be converged effectively by the convex surface 102, so that the light extraction efficiency of the lens structure is increased. Moreover, by the annular groove 104 on the first surface 10 of the lens structure, some of the light can pass through the second surface 20 to exit the lens structure (it is equivalent to having some lighting effects like the refractive lens), so as to improve the light extraction uniformity of the lens structure and prevent the user from easily being able to see a shadow cast by the top of the lens structure. Furthermore, with appropriate selection of the height H of the first sidewall 104A, the amount of light exiting from the second surface 20 and from the light output surface 30 can be closer to each other and thus the lens structure can have a better light extraction uniformity. Alternatively, with appropriate selection of the angle γ between the second sidewall 104B and the first sidewall 104A, the size of the bright ring of the lens structure can also be changed.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A lens structure, adapted to be optically coupled to a light source, the lens structure comprising:
    a first surface, including a convex surface protruding toward the light source;
    a second surface, opposite the first surface;
    a light output surface, connecting the first surface and the second surface; and
    an annular groove, wherein the convex surface is surrounded by the annular groove, and the cross section of the annular groove is a triangle and includes a first sidewall and a second sidewall, the first sidewall is adjacent to the convex surface, and an angle is formed between the second sidewall and the first sidewall,
    wherein some light provided by the light source is reflected by the first sidewall and then passes through the second surface.

2. The lens structure as claimed in claim 1, wherein the first surface further forms a recess, the convex surface being formed in the recess, and the light source is adjacent to the recess.

3. The lens structure as claimed in claim 2, wherein the annular groove is formed in the recess.

4. The lens structure as claimed in claim 1, wherein the amount of light exiting from the second surface is affected by the height of the first sidewall, and the amount of light exiting from the second surface and the height of the first sidewall are in positive relation.

5. The lens structure as claimed in claim 1, wherein the light output surface is an inclined surface with a single slope.

6. The lens structure as claimed in claim 1, wherein the annular groove is formed on the first surface.

7. A lamp, comprising:
    at least one lens structure as claimed in claim 1;
    at least one light source; and
    a lamp housing, wherein light emitted from the at least one light source is refracted and/or reflected by the at least one lens structure, then exits the at least one lens structure, and passes through the lamp housing.

8. A backlight module, comprising:
    at least one lens structure as claimed in claim 1;
    at least one light source; and
    an optical plate, wherein light emitted from the at least one light source is refracted and/or reflected by the at least one lens structure, then exits the at least one lens structure, and is converted to planar light by the optical plate.

9. A display device, comprising:
    at least one lens structure as claimed in claim 1;
    at least one light source;
    an optical plate; and
    a display panel, wherein light emitted from the at least one light source is refracted and/or reflected by the at least one lens structure, then exits the at least one lens structure, and is converted to planar light by the optical plate, the planar light being used as a backlight source of the display device.

10. A lens structure, adapted to be optically coupled to a light source, the lens structure comprising:
a first surface, including a convex surface protruding toward the light source;
a second surface, opposite the first surface;
a light output surface, connecting the first surface and the second surface; and
an annular groove, wherein the convex surface is surrounded by the annular groove, and the cross section of the annular groove is a triangle and includes a first sidewall and a second sidewall, the first sidewall is adjacent to the convex surface, and an angle is formed between the second sidewall and the first sidewall,
wherein a distance between a light output position of some light exiting from the light output surface and an optical axis of the lens structure is affected by the angle between the second sidewall and the first sidewall, and the distance and the angle between the second sidewall and the first sidewall are in negative relation.

11. The lens structure as claimed in claim 10, wherein the first surface further forms a recess, the convex surface being formed in the recess, and the light source is adjacent to the recess.

12. The lens structure as claimed in claim 11, wherein the annular groove is formed in the recess.

13. The lens structure as claimed in claim 10, wherein the amount of light exiting from the second surface is affected by the height of the first sidewall, and the amount of light exiting from the second surface and the height of the first sidewall are in positive relation.

14. The lens structure as claimed in claim 13, wherein the light output surface is an inclined surface with a single slope.

15. The lens structure as claimed in claim 10, wherein the annular groove is formed on the first surface.

16. A lamp, comprising:
at least one lens structure as claimed in claim 10;
at least one light source; and
a lamp housing, wherein light emitted from the at least one light source is refracted and/or reflected by the at least one lens structure, then exits the at least one lens structure, and passes through the lamp housing.

17. A display device, comprising:
at least one lens structure as claimed in claim 10;
at least one light source;
an optical plate; and
a display panel, wherein light emitted from the at least one light source is refracted and/or reflected by the at least one lens structure, then exits the at least one lens structure, and is converted to planar light by the optical plate, the planar light being used as a backlight source of the display device.

18. A display device, comprising:
at least one lens structure as claimed in claim 10;
at least one light source;
an optical plate; and
a display panel, wherein light emitted from the at least one light source is refracted and/or reflected by the at least one lens structure, then exits the at least one lens structure, and is converted to planar light by the optical plate, the planar light being used as a backlight source of the display device.

* * * * *